US012322915B2

(12) United States Patent
Chin

(10) Patent No.: US 12,322,915 B2
(45) Date of Patent: Jun. 3, 2025

(54) ELECTRIC SIGNAL ADAPTING DEVICE

(71) Applicant: ENERGY FULL ELECTRONICS CO., LTD., New Taipei (TW)

(72) Inventor: Hsu-Shen Chin, New Taipei (TW)

(73) Assignee: ENERGY FULL ELECTRONICS CO., LTD., New Taipei (TW)

( * ) Notice: Subject to any disclaimer, the term of this patent is extended or adjusted under 35 U.S.C. 154(b) by 640 days.

(21) Appl. No.: 17/699,118

(22) Filed: Mar. 20, 2022

(65) Prior Publication Data

US 2023/0127316 A1 Apr. 27, 2023

(30) Foreign Application Priority Data

Oct. 21, 2021 (TW) ................................ 110212435

(51) Int. Cl.

| | |
|---|---|
| ***H01R 27/02*** | (2006.01) |
| ***H01R 13/629*** | (2006.01) |
| ***H01R 13/639*** | (2006.01) |
| ***H01R 13/713*** | (2006.01) |
| ***H01R 24/28*** | (2011.01) |
| *H01R 13/70* | (2006.01) |

(52) U.S. Cl.

CPC ........... *H01R 27/02* (2013.01); *H01R 13/629* (2013.01); *H01R 13/639* (2013.01); *H01R 13/713* (2013.01); *H01R 24/28* (2013.01); *H01R 13/701* (2013.01)

(58) Field of Classification Search

CPC ..... H01R 13/629; H01R 27/02; H01R 13/639

See application file for complete search history.

(56) References Cited

U.S. PATENT DOCUMENTS

| | | | | | |
|---|---|---|---|---|---|
| 2,384,267 | A * | 9/1945 | Andersen | H01R 24/84 | 439/284 |
| 3,745,512 | A * | 7/1973 | Johnson | H01R 13/434 | 439/732 |
| 4,684,186 | A * | 8/1987 | Hetherington | H01R 29/00 | 439/651 |

(Continued)

FOREIGN PATENT DOCUMENTS

| | | |
|---|---|---|
| CN | 106120173 A | 11/2016 |
| CN | 207217877 U | 4/2018 |

(Continued)

*Primary Examiner* — Neil Abrams

(74) *Attorney, Agent, or Firm* — Rivka Friedman

(57) ABSTRACT

An electric signal adapting device includes at least one first adapting interface and at least one first adaptor. The at least one first adapting interface comprises a magnetic component and a magnetic sensing component. The first adaptor is placed in correspondence with the first adapting interface. The first adaptor is electrically connected to each of the corresponding at least one first adapting interface for transferring the DC electric signal and connecting the DC electric signal to an external device. The magnetic component is configured to attract the at least one first adaptor. The magnetic sensing component is configured to determine whether the at least one first adaptor is correctly placed. When the magnetic sensing component determines that the at least one first adaptor is correctly placed, the at least one first adapting interface transfers the DC electric signal to the at least one first adaptor.

18 Claims, 6 Drawing Sheets

(56) References Cited

U.S. PATENT DOCUMENTS

| | | | | | |
|---|---|---|---|---|---|
| 4,993,970 | A * | 2/1991 | Littrell | H01R 25/006 439/535 |
| 6,336,832 | B2 * | 1/2002 | Nobe | H01R 13/112 439/910 |
| 6,830,477 | B2 * | 12/2004 | Vander Vorste | H01R 13/743 439/535 |
| 7,497,740 | B2 * | 3/2009 | Mei | H01R 25/003 439/651 |
| 7,556,511 | B1 * | 7/2009 | Hsu | H01R 25/142 439/652 |
| 7,695,292 | B2 * | 4/2010 | Lee | G06F 13/409 439/540.1 |
| 8,212,427 | B2 * | 7/2012 | Spitaels | H01R 25/142 307/147 |
| 8,585,444 | B2 * | 11/2013 | Chang | H01R 13/627 439/651 |
| 9,666,985 | B2 * | 5/2017 | Bernardi | H01R 13/6477 |
| 11,742,625 | B2 * | 8/2023 | Jin | H01R 13/713 439/39 |
| 2008/0012423 | A1 * | 1/2008 | Mimran | H01R 31/065 307/11 |
| 2018/0109054 | A1 | 4/2018 | Chin | |
| 2023/0127316 | A1 * | 4/2023 | Chin | H01R 13/639 439/188 |

FOREIGN PATENT DOCUMENTS

| | | | |
|---|---|---|---|
| CN | 209119508 | U | 7/2019 |
| CN | 209290201 | U | 8/2019 |

* cited by examiner

ELECTRIC SIGNAL ADAPTING DEVICE

CROSS REFERENCE

This application claims the priority of Taiwanese Patent Application No. 110212435, entitled "ELECTRIC SIGNAL ADAPTING DEVICE", filed on Oct. 21, 2021, the disclosure of which is incorporated herein by reference in its entirety.

FIELD OF THE DISCLOSURE

The present disclosure relates to an electric signal adapting device, and more particularly, to an electric signal adapting device that has replaceable components.

BACKGROUND

As the development progress of the electronic devices, electronic devices should use different cables to get the power and/or to transfer data. When the users have multiple electronic devices, the user needs to have corresponding power supplies or data transmission interfaces. For example, the cables of household appliances have tens of different specifications, including different voltage specifications. In addition, small 3C products often use universal series bus (USB) for power or data transmission. The USB cable also has multiple types. Furthermore, the household appliances often use an alternative current (AC) power but the 3C products often use a direct current (DC) power.

From the above, a user may need to have all kinds of signal adapting devices. This means that the user needs to spend the money, time, and spaces for these adapting devices. In addition, there might be a safety issue if these adapting devices are connected to the same extension cord.

SUMMARY

One objective of an embodiment of the present disclosure is to provide an electric signal adapting device to alleviate the above-mentioned issues.

According to an embodiment of the present disclosure, an electric signal adapting device is disclosed. The electric signal adapting device comprises: at least one first adapting interface, configured to transfer a direct current (DC) electric signal, the at least one first adapting interface comprises a magnetic component and a magnetic sensing component; and at least one first adaptor, placed in correspondence with the at least one first adapting interface, wherein each of the at least one first adaptor is electrically connected to each of the corresponding at least one first adapting interface for transferring the DC electric signal and connecting the DC electric signal to an external device. The magnetic component is configured to attract the at least one first adaptor; the magnetic sensing component is configured to determine whether the at least one first adaptor is correctly placed. When the magnetic sensing component determines that the at least one first adaptor is correctly placed, the at least one first adapting interface transfers the DC electric signal to the at least one first adaptor.

According to an embodiment of the present disclosure, the electric signal adapting device further comprises an upper shell, having at least one slot, each of the at least one first adaptor is installed in each of the corresponding at least one slot such that each of the at least one first adaptor is electrically connected to each of the corresponding at least one first adapting interface.

According to an embodiment of the present disclosure, the electric signal adapting device further comprises a cable contacting section, a lower shell and a plug module. The lower shell has a cable interface. The cable interface is electrically connected to the at least one first adapting interface. The plug module has a cable and a plug contacting section. The plug contacting section is configured to contact the cable contacting section for electric connection and to connect an external alternative current (AC) power or the DC electric signal to the cable contacting section through the cable.

According to an embodiment of the present disclosure, the plug contacting section comprises a clamping sheet set; the cable contacting section is a protruded plug. When the plug contacting section combines with the cable contacting section, the clamping sheet set holds and fixes the cable contacting portion.

According to an embodiment of the present disclosure, the plug module further comprises a positioning pillar. The cable interface has a positioning pillar contacting section. When the plug contacting section combines with the cable contacting section, the positioning pillar is inserted into the positioning pillar contacting section to stabilize a connection between the plug contacting section and the cable contacting section.

According to an embodiment of the present disclosure, the cable interface comprises a guiding hole. The positioning pillar contacting section is placed in the guiding hole. The guiding hole is configured to prevent the positioning pillar from being skewed when the positioning pillar is inserted.

According to an embodiment of the present disclosure, a cross-section shape of the positioning pillar is a round, a square, a rectangular, triangle, an oval, or a polygon.

According to an embodiment of the present disclosure, the plug module has a buckle section. The cable interface further comprises a blocking section. When the plug contacting section combines with the cable contacting section, the snap section buckles up the blocking section to fix the plug module and the cable interface.

According to an embodiment of the present disclosure, the electric signal adapting device further comprises a flip cover, connected to the lower shell through a flip cover fixing section, wherein when the flip cover is closed, the flip cover covers and fixes the at least one first adaptor and the upper shell.

According to an embodiment of the present disclosure, the plug module further comprises a protection switch, configured to control whether the plug module transfers the external AC power to the cable interface.

According to an embodiment of the present disclosure, an installation process of the at least one first adaptor is not directional.

According to an embodiment of the present disclosure, the electric signal adapting device further comprises a power converting module, configured to convert an external AC power into the DC electric signal.

According to an embodiment of the present disclosure, the electric signal adapting device further comprises at least one second adapting interface, configured to transfer an external AC power, and at least one second adaptor, placed in correspondence with the at least one second adapting interface, wherein each of the at least one second adaptor is electrically connected to each of the corresponding at least one second adapting interface for transferring the external AC power to the external device.

According to an embodiment of the present disclosure, the first adaptor is smaller than the second adaptor.

According to an embodiment of the present disclosure, the electric signal adapting device further comprises an upper shell, having at least one slot, each of the at least one second adaptor is installed in each of the corresponding at least one slot such that each of the at least one second adaptor is electrically connected to each of the corresponding at least one second adapting interface.

According to an embodiment of the present disclosure, the at least one first adaptor complies with POGO PIN specification.

According to an embodiment of the present disclosure, the at least one first adaptor is capable of being connected to USB A, USB B or USB C type of plugs.

According to an embodiment of the present disclosure, the at least one first adaptor provides a DC power to the external device.

According to an embodiment of the present disclosure, a plug module comprises a cable, a plug contacting section comprising a clamping sheet set, and a positioning pillar. A cross-section shape of the positioning pillar is a round, a square, a rectangular, triangle, an oval, or a polygon.

According to an embodiment of the present disclosure, the plug module further comprises a buckle section.

According to an embodiment of the present disclosure, the plug module further comprises a protection switch, configured to control whether the plug module transfers the external AC power.

Accordingly, the electric signal adaption becomes more convenient. In addition, the electric signal adapting device could have the benefits of space saving and a better safety.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

Figure 1:
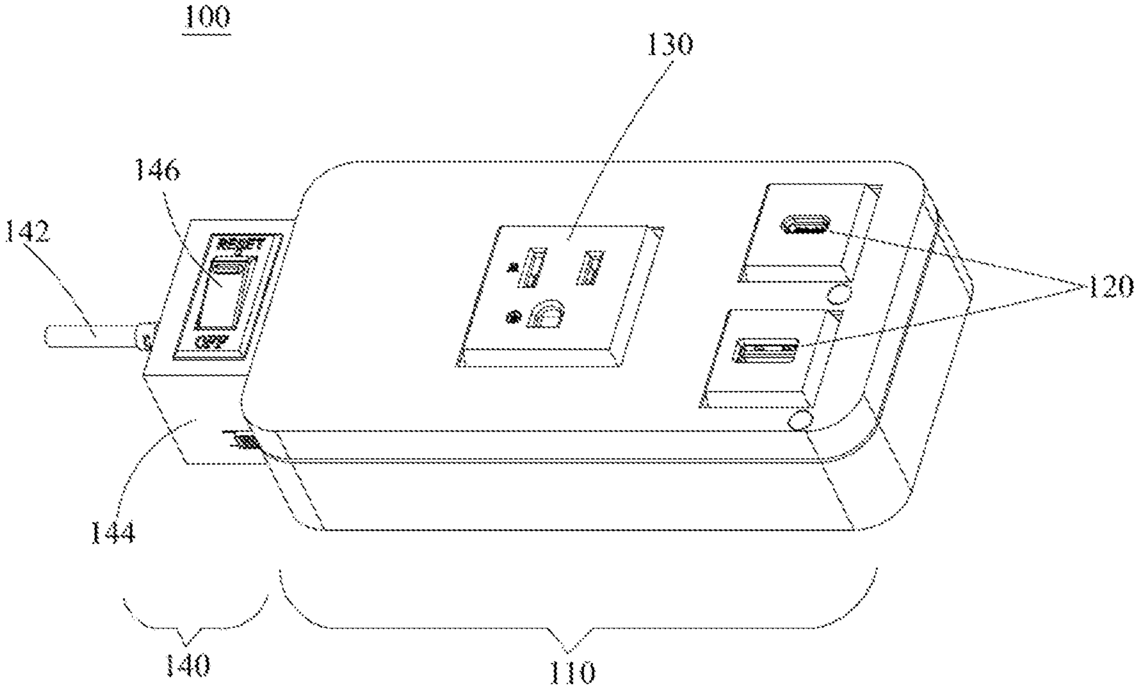
FIG. 1 is a diagram of an electric signal adapting device according to an embodiment of the present disclosure.

Please refer to FIG. 1. FIG. 1 is a diagram of an electric signal adapting device 100 according to an embodiment of the present disclosure. The electric signal adapting device 100 comprises a main body 110, a first adaptor 120, a second adaptor 130 and a plug module 140. The first adaptor 120 is, for example, a USB type A port, an USB type B port, a USB type C port, a USB mini-A port, a USB mini-B port, a USB micro-A port, a USB micro-B port, a Thunderbolt port, or their combination, for transferring an DC signal to an external electric device. Here, the DC power signal could be only used for providing power to the external electronic device or could be further used for data transmission. It should be understood, in the embodiment shown in FIG. 1, the electric signal adapting device 100 comprises two first adaptors 120. However, the number and the type of the first adaptors 120 are not limited as this embodiment. A person having an ordinary skill in the art could change the number or the type of the first adaptors according to actual needs.

For example, the electric signal adapting device 100 could have only one first adaptor 120 or more than two first adaptors 120. Here, one of the first adaptors 120 could be RJ45 network port for providing a power and data transmission for an equipment supporting a power over Ethernet (PoE). Here, the PoE equipment could be a computer, a network phone, a wireless base station, a webcam, etc. In another embodiment, the first adaptor 120 could be any DC power plug to provide a DC power to any device, such as a Bluetooth speaker, a night lamp, or a bell.

The second adaptor 130 could be a normal AC electricity plug for transmitting an external AC signal to the external electronic device. It should be understood that the plug shown in FIG. 1 is a three-hole (front line, null/neutral line, and ground line) plug but this is only an example, not a limitation of the present disclosure. In an embodiment, the second adaptor 130 could be a household power plug, such as A-type plug, B-type plug, C-type plug, D-type plug, E-type plug, F-type plug, G-type plug, H-type plug, I-type plug, J-type plug, K-type plug, L-type plug, M-type plug, N-type plug, etc. Here, in this embodiment, because the electric signal adapting device 100 comprises two first adaptors 120, the size of the first adaptor 120 is smaller than the size of the second adaptor 130 such that the space and appearance could be better arranged.

The plug module 140 could comprise a cable 142, a plug contacting section 144 and a protection switch 146. The plug contacting section 144 is connected to an external signal source through the cable 142 and transfers the external electric signal source to the first adaptor 120 and the second adaptor 130 on the main body 110 of the electric signal adapting device 100 such that the first adaptor 120 and the second adaptor 130 could further use the external signal source. The cable 142 could be, for example, a power line that comply with the electricity load or a network signal line. For example, when the cable 142 is a power line, it could receive an external AC power signal to provide a power to an external device connected to the first adaptor 120 and the second adaptor 130. When the cable 142 is a network signal line, it could be connected to an Ethernet network modulator/demodulator to provide network signals to an external device connected to the first adaptor 120.

In addition, the plug module 140 could be manufactured together with the main body 110 in one process or could be adhered or packaged on the main body 110. Or, the plug module 140 could be a removable component, which could be separated from the main body 110. The structure of the plug module 140 will be illustrated in more detail with figures.

The protection switch 146 could be placed on the plug contacting section 144 and could allow the user to manually control whether the plug contacting section 144 transfers the external electric signal source sent from the cable 142 or not. Through this, the user could manually avoid unnecessary power consumption when the external electronic device is not being used. This could also reduce the number of times for plugging/unplugging the first adaptors 120 or the second adaptors 130 such that the product lifetime could be longer.

Figure 2:
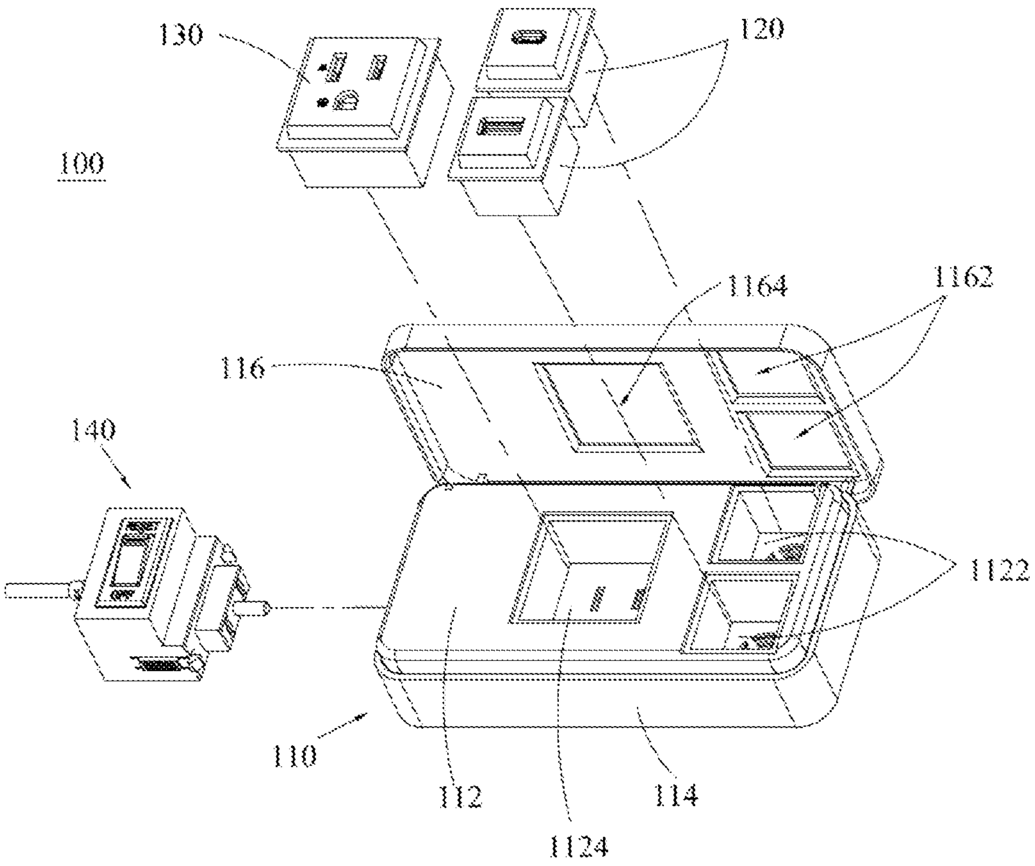
FIG. 2 is a diagram of the first adaptor, the second adaptor, the plug module and the main body shown in FIG. 1.

Please refer to FIG. 2. FIG. 2 is a diagram of the first adaptor 120, the second adaptor 130, the plug module 140 and the main body 110 shown in FIG. 1. The main body 110 of the electric signal adapting device 100 could comprise an upper shell 112, a lower shell 114 and a flip cover 116. In this embodiment, the first adaptor 120 and the second adaptor 130 are removable components. The upper shell 112 is combined with the lower shell 114. The upper shell 112 has a slot 1122 and a slot 1124. The slot 1122 is correspondingly provided for the first adaptor 120 to install. The slot 1124 is correspondingly provided for the second adaptor 130 to install. Here, the size of the slot 1122 is slightly larger than the size of the first adaptor 120 and the size the slot 1124 is slightly larger than the size of the second adaptor 130 such that the first adaptor 120 and the second adaptor 130 could be successfully installed.

The flip cover 116 is a component that could be open. The flip cover 116 is connected to one side of the lower cover 114 through a flip fixing section. The flip fixing section could be a hinge, a flexible plastic unit, a latch, an elastic unit (such as a string), etc. such that the flip cover 116 could be open according to the actual demands. It should be noted that the present disclosure does not limit the type of the flip fixing unit and any movable connecting component could be the flip fixing unit.

In addition, the flip cover 116 has two vias 1162 corresponding to the two slots 1122 and a via 1164 corresponding to the slot 1124. The via 1162 is smaller than the first adaptor 120 and the via 1164 is smaller than the second adaptor 130. Through this, when the flip cover 116 is closed, the flip cover 116 could cover the edges of the first adaptors 120 and the second adaptor 130 to prevent the first adaptors 120, the second adaptor 130 and the upper cover 112 from escaping due to some accidents.

Figure 3:
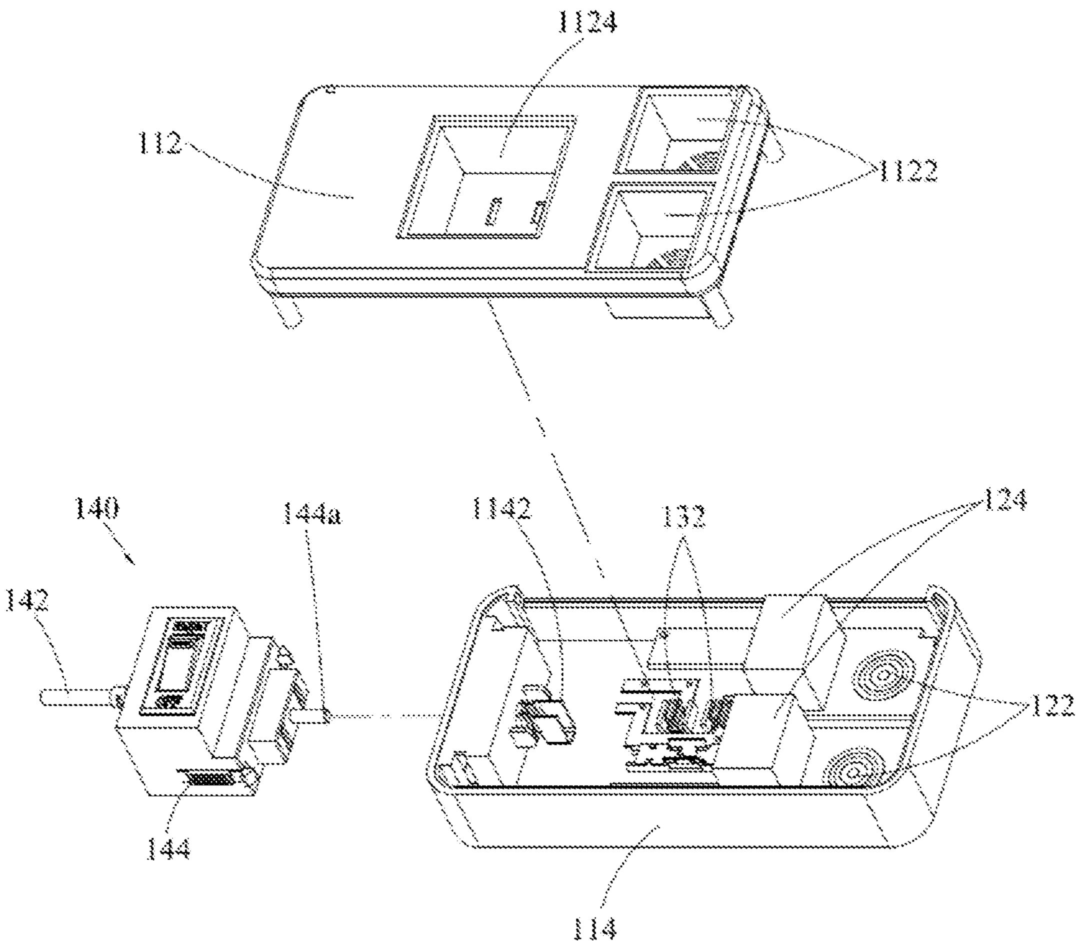
FIG. 3 is an exploded view of the plug module and the main body shown in FIG. 1.

As for the inner structure of the electric signal adapting device 100, please refer to FIG. 3. FIG. 3 is an exploded view of the plug module 140 and the main body 110 shown in FIG. 1. The lower shell 114 has a first adapting interface 122, a power converting module 124, a second adapting interface 132 and a cable interface 1142. Furthermore, the plug contacting section 144 has a positioning pillar **144*a*. In this embodiment, the plug module 140 transfers the external AC power from the cable 142 to the cable interface 1142. The first adapting interface 122 is electrically connected to the cable interface 1142 through the power converting module 124. That is, the first adapting interface 122 transfers the DC electric signal converted by the power converting module 124. The second adapting interface 132 is electrically connected to the cable interface 1142 to transfer the external AC power. Preferably, the power converting module 124 and the second converting interface 142** are connected in parallel to transfer the external AC power.

Figure 4:
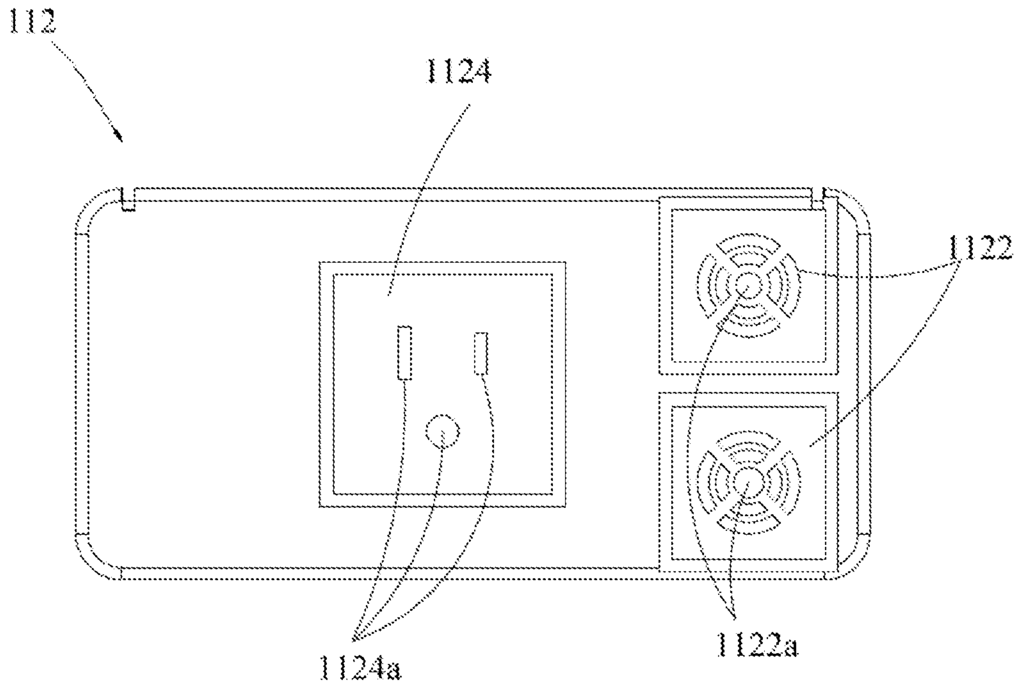
FIG. 4 is a top view of an upper shell of the electric signal adapting device according to an embodiment of the present disclosure.

Please refer to FIG. 4. FIG. 4 is a top view of an upper shell 112 of the electric signal adapting device 100 according to an embodiment of the present disclosure. The slot 1122 of the upper shell 112 has a groove-like via **1122*a*. The slot 1124 has a groove-like via 1124*a*. The via 1122*a* is placed correspondingly to the first adapting interface 122. The via 1124*a* is placed correspondingly to the second adapting interface 132. Through this, when the first adaptor 120 and the second adaptor 130 respectively correspondingly connects to the slot 1122 and the slot 1124 of the upper shell, the first adaptor 120 could be electrically connected to the first adapting interface 122 through the via 1122*a* to transfer the DC electric signal and the second adaptor 130 could be electrically connected to the second adapting interface 132 through the via 1124*a*** to transfer the external AC power.

The first adapting interface 122 could be, for example, in a form of a POGO PIN to be electrically connected to the first adaptor 120. The second adapting interface 132 could be, for example, a three-hole plug to be electrically connected to the second adaptor 130. Please note, the present disclosure does not limit the types of the first adapting interface 122 and the second adapting interface 132 and these types could be changed according to the actual demands.

Figure 5:
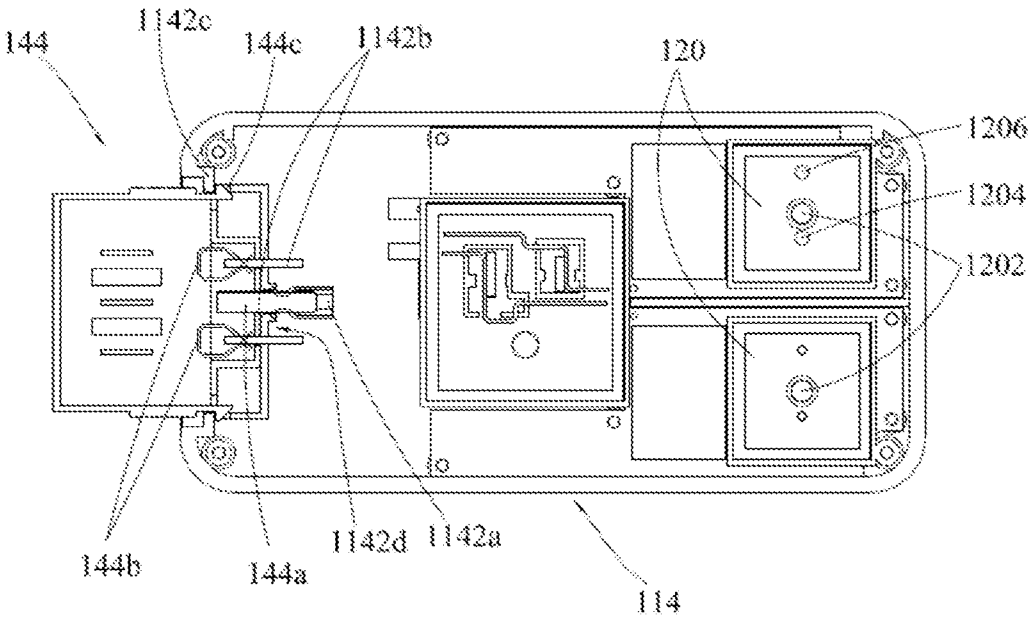
FIG. 5 is a bottom view of a cross section of an inner structure of the electric signal adapting device according to an embodiment of the present disclosure.

As for the detailed connection between the plug module 140 and the cable interface 1142, please refer to FIG. 3 in conjunction with FIG. 5. FIG. 5 is a bottom view of a cross section of an inner structure of the electric signal adapting device according to an embodiment of the present disclosure. The plug contacting section 144 of the plug module 140 could be, for example, a female socket, having a positioning pillar **144*a*, a clamping sheet set 144*b* and a buckle module 144*c*. The cable interface 1142 is, for example, a protruded male socket. In this embodiment, the cable interface 1142 comprises a positioning pillar contacting section 1142***a*, a cable contacting section 1142*b*, a blocking section 1142*c* and a guiding hole 1142*d*.

When the plug contacting section 144 of the plug module 140 is to be connected with the cable interface 1142 of the main body 110, the positioning pillar 144*a* could be, for example, guided by the guiding hole 1142*d* to enter the positioning pillar contacting section 1142*a*. Specifically, the positioning pillar 144*a* is a straight pillar and the shape of its cross-section could be a round, a square, a rectangular, triangle, an oval, or a polygon. The guiding hole 1142*d* is also a straight channel and its cross-section could have the same shape of the positioning pillar 144*a* and could be slightly larger than the positioning pillar 144*a* such that the positioning pillar 144*a* could be straightly (not skewed) combined with the positioning pillar contacting section 1142*a*. In addition, the positioning pillar contacting section 1142*a* could be, for example, clamping sheets to hold the positioning pillar 144*a* through frictions. Please note, the present invention does not limit the type of the positioning pillar contacting section 1142*a*. In the actual implementation, the positioning pillar contacting section 1142*a* could be made with a magnetic material to hold the positioning pillar 144*a* by magnetic forces or the positioning pillar contacting section 1142*a* could be any other structure that could hold the positioning pillar 144*a*.

Through the straight connection between the positioning pillar 144*a* and the positioning pillar contacting section 1142*a*, the cable contacting section 1142*b* of the cable interface 1142 could be successfully combined with the clamping sheet set 144*b* of the plug contacting section 144. Here, the number of the clamping sheet sets 144*b* is the same of the number of the pins of the cable contacting section 1142*b* and the clamping sheet set 144*b* correspondingly holds and fixes the corresponding pin of the cable contacting section 1142*b*.

The plug module 140 could further stabilize the connection with the cable interface 1142 through the buckle module 144*c*. Here, the buckle module 144*c* of the plug module 140 is a protruded buckle and the blocking section 1142*c* is a bump for the corresponding buckle module 144*c* to buckle up as shown in FIG. 5. In this embodiment, the buckle module 144*c* could be placed at the right and left sides of the front end of the plug contacting section 144 of the plug module 140. However, this is not a limitation of the present disclosure. In the actual implementation, the buckle module 144*c* could be placed at the opposite or non-opposite sides of the plug contacting section 144 of the plug module 140. Or a single or more buckles module 144*c* could be included and one or more blocking sections 1142*c* of the cable interface 1142 are corresponding arranged.

In FIG. 5, the first adaptor 120 has a magnetic component 1202, a terminal 1204 and a terminal 1206. The magnetic component 1202 could be a permanent magnet made with a Ferrite, an Al—Ni—Co alloy, a rare earth magnet, a Neodymium magnet, and/or a samarium-cobalt magnet. When the first adaptor 120 is inserted into the slot 1122, the magnetic component 1202 could attract the first adapting interface 122 by magnetic force to strengthen the connection and to prevent the first adaptor 120 from loosing and the introduced signal loss or unstable transmission. In an embodiment, the magnetic component 1202 could be a non-permanent magnet, such as an electromagnet generated by a current. This change also falls within the scope of the present disclosure.

Figure 6:
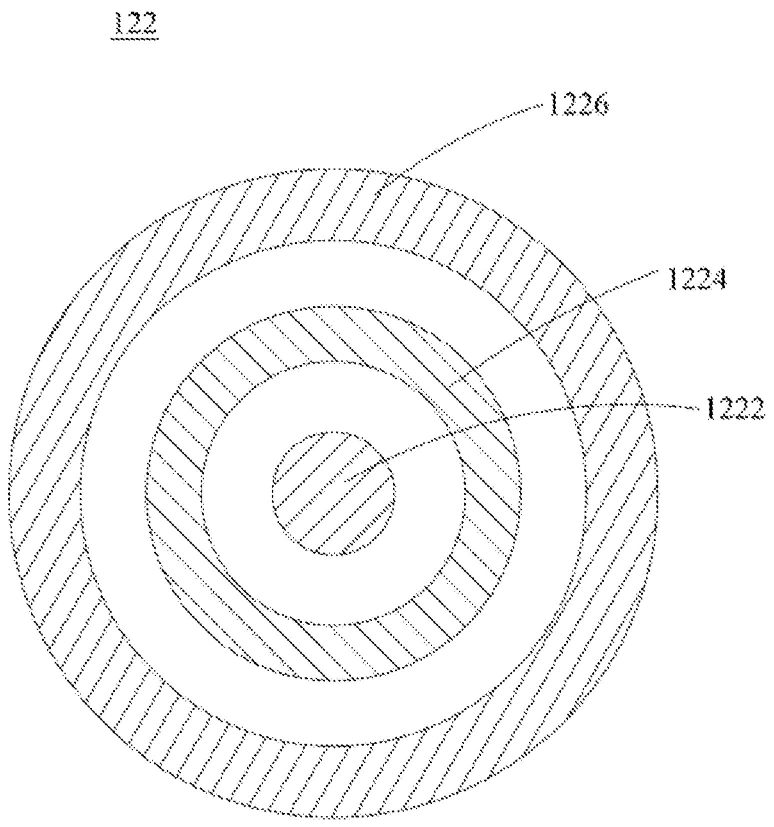
FIG. 6 is a top view of an adapting interface according to an embodiment of the present disclosure.

Please refer to FIG. 6. FIG. 6 is a top view of a first adapting interface 122 according to an embodiment of the present disclosure. In another embodiment, the first adapting interface 122 comprises a magnetic sensing component 1222, a first conductive section 1224 and a second conductive section 1226. In this embodiment, the magnetic sensing component 1222 could detect whether the magnetic component 1202 correctly attract the first adapting interface 122. For example, the magnetic sensing component 1222 could detect the contacting area between the magnetic component 1202 and the magnetic sensing component 1222 or the magnitude of the magnetic force to determine whether the first adaptor 120 is correctly placed. When the magnetic sensing component 1222 determines that the first adaptor 120 is correctly placed, the first adapting interface 122 could start to transfer the DC electric signal to the first adaptor 120. In this way, the current leakage could be avoided.

Furthermore, the magnetic sensing component 1222 could also be a magnetic component such that the magnetic sensing component 1222 could be attracted to the magnetic component 1202 of the first adaptor 120 through the via 1122*a* when the first adaptor 120 is installed in the slot 1122. It should be understood that, in an embodiment, the magnetic sensing component 1222 could be purely a metal with Ferromagnetism (strong magnetic force) for magnetic attraction of the magnetic component 1202. Or, the magnetic sensing component 1222 could be a permanent magnet and the magnetic component 1202 could be a metal with Ferromagnetism (strong magnetic force) such that the magnetic component 1202 could actively attract the magnetic sensing component 1222.

The terminal 1204 and the terminal 1206 of the first adaptor 120 could be, for example, POGO PINs or terminals that could be electrically connected to the POGO PIN such that the terminals 1204 and 1206 could be electrically connected to the first adapting interface 122 through the via 1122*a* when they are inserted into the slot 1122. Specifically, the terminal 1204 is used to transfer a first voltage level through the first conductive section 1224 of the first adapting interface 122. The terminal 1206 is used to transfer a second voltage level through the second conductive section 1226 of the first adapting interface 122. Please note, the first adapting interface 122 is arranged, for example, in concentric circles. That is, the first conductive section 1224 surrounds the magnetic sensing component 1222 as a center of the circle and the second conductive section 1226 surrounds the first conductive section 1224. Through this, no matter what the direction the first adaptor 120 is inserted in, the terminal 1204 could be successfully electrically connected to the first conductive section 1224 and the terminal 1206 could be successfully electrically connected to the second conductive section 1226 to respectively transfer the right voltages. That is, the installation process of the first adaptor 120 is not directional.

According to the above disclosure, the electric signal adaption becomes more convenient. In addition, the electric signal adapting device could have the benefits of space saving and a better safety.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An electric signal adapting device, comprising:

at least one first adapting interface, configured to transfer a direct current (DC) electric signal, the at least one first adapting interface comprises a magnetic component and a magnetic sensing component; and at least one first adaptor, placed in correspondence with the at least one first adapting interface, wherein each of the at least one first adaptor is electrically connected to each of the corresponding at least one first adapting interface for transferring the DC electric signal and connecting the DC electric signal to an external device;

wherein the magnetic component is configured to attract the at least one first adaptor; the magnetic sensing component is configured to determine whether the at least one first adaptor is correctly placed; when the magnetic sensing component determines that the at least one first adaptor is correctly placed, the at least one first adapting interface transfers the DC electric signal to the at least one first adaptor.

2. The electric signal adapting device of claim 1, further comprising:

an upper shell, having at least one slot, each of the at least one first adaptor is installed in each of the corresponding at least one slot such that each of the at least one first adaptor is electrically connected to each of the corresponding at least one first adapting interface.

3. The electric signal adapting device of claim 2, further comprising a cable contacting section, and the electric signal adapting device further comprises:

a lower shell, having a cable interface, wherein the cable interface is electrically connected to the at least one first adapting interface; and a plug module, having a cable and a plug contacting section, wherein the plug contacting section is configured to contact the cable contacting section for electric connection and to connect an external alternative current (AC) power or the DC electric signal to the cable contacting section through the cable.

4. The electric signal adapting device of claim 3, wherein the plug contacting section comprises a clamping sheet set; the cable contacting section is a protruded plug; and when the plug contacting section combines with the cable contacting section, the clamping sheet set holds and fixes the cable contacting potion.

5. The electric signal adapting device of claim 3, wherein the plug module further comprises a positioning pillar; the cable interface has a positioning pillar contacting section; and when the plug contacting section combines with the cable contacting section, the positioning pillar is inserted into the positioning pillar contacting section to stabilize a connection between the plug contacting section and the cable contacting section.

6. The electric signal adapting device of claim 5, wherein the cable interface comprises a guiding hole; the positioning pillar contacting section is placed in the guiding hole; and the guiding hole is configured to prevent the positioning pillar from being skewed when the positioning pillar is inserted.

7. The electric signal adapting device of claim 5, wherein a cross-section shape of the positioning pillar is a round, a square, a rectangular, triangle, an oval, or a polygon.

8. The electric signal adapting device of claim 3, wherein the plug module has a buckle section; the cable interface further comprises a blocking section; and when the plug contacting section combines with the cable contacting section, the snap section buckles up the blocking section to fix the plug module and the cable interface.

9. The electric signal adapting device of claim 3, further comprising:

a flip cover, connected to the lower shell through a flip cover fixing section, wherein when the flip cover is closed, the flip cover covers and fixes the at least one first adaptor and the upper shell.

10. The electric signal adapting device of claim 3, wherein the plug module further comprises a protection switch, configured to control whether the plug module transfers the external AC power to the cable interface.

11. The electric signal adapting device of claim 2, wherein an installation process of the at least one first adaptor is not directional.

12. The electric signal adapting device of claim 1 further comprising:

a power converting module, configured to convert an external AC power into the DC electric signal.

13. The electric signal adapting device of claim 1 further comprising:

at least one second adapting interface, configured to transfer an external AC power; and at least one second adaptor, placed in correspondence with the at least one second adapting interface, wherein each of the at least one second adaptor is electrically connected to each of the corresponding at least one second adapting interface for transferring the external AC power to the external device.

14. The electric signal adapting device of claim 13, wherein the first adaptor is smaller than the second adaptor.

15. The electric signal adapting device of claim 13, further comprising:

an upper shell, having at least one slot, each of the at least one second adaptor is installed in each of the corresponding at least one slot such that each of the at least one second adaptor is electrically connected to each of the corresponding at least one second adapting interface.

16. The electric signal adapting device of claim 1, wherein the at least one first adaptor complies with POGO PIN specification.

17. The electric signal adapting device of claim 1, wherein the at least one first adaptor is capable of being connected to Universal Serial Bus (USB) A, USB B or USB C type of plugs.

18. The electric signal adapting device of claim 1, wherein the at least one first adaptor provides a direct current (DC) power to the external device.

* * * * *